United States Patent
Cao et al.

(10) Patent No.: US 11,790,406 B2
(45) Date of Patent: Oct. 17, 2023

(54) SYSTEMS AND METHODS FOR IMPROVED ONLINE PREDICTIONS

(71) Applicant: Walmart Apollo, LLC, Bentonville, AR (US)

(72) Inventors: Xuan Cao, Fremont, CA (US); Georgios Rovatsos, San Francisco, CA (US); Wei Shen, Pleasanton, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 17/588,778

(22) Filed: Jan. 31, 2022

(65) Prior Publication Data
US 2023/0245177 A1    Aug. 3, 2023

(51) Int. Cl.
*G06Q 30/0273* (2023.01)
*G06Q 30/0241* (2023.01)
*G06Q 30/0242* (2023.01)

(52) U.S. Cl.
CPC ..... *G06Q 30/0275* (2013.01); *G06Q 30/0242* (2013.01); *G06Q 30/0249* (2013.01); *G06Q 30/0276* (2013.01)

(58) Field of Classification Search
CPC . G06Q 30/0207–0277; G06Q 30/0275; G06Q 30/0242; G06Q 30/0249; G06Q 30/0276
USPC ...................................................... 705/14.43
See application file for complete search history.

(56) References Cited

U.S. PATENT DOCUMENTS

| | | | |
|---|---|---|---|
| 9,530,148 B2* | 12/2016 | Flatt | H04N 21/23424 |
| 9,542,707 B2 | 1/2017 | Hassan et al. | |
| 10,891,922 B1* | 1/2021 | Batra | G06V 40/161 |
| 10,970,742 B1 | 4/2021 | Knijnik et al. | |
| 11,341,518 B1* | 5/2022 | McCurdy | G06Q 30/0201 |
| 2006/0123000 A1* | 6/2006 | Baxter | G06F 16/30 707/999.005 |
| 2007/0112840 A1* | 5/2007 | Carson | G06Q 30/02 707/999.102 |
| 2007/0260515 A1* | 11/2007 | Schoen | G06Q 30/02 705/14.69 |

(Continued)

OTHER PUBLICATIONS

Call Centre Helper.com, How to Calculate Forecast Accuracy, Internet Archive Capture date of Dec. 29, 2019 from URL https://www.callcentrehelper.com/calculate-forecast-accuracy-113808.htm, (Year: 2019).*

(Continued)

*Primary Examiner* — Tarek Elchanti
(74) *Attorney, Agent, or Firm* — BRYAN CAVE LEIGHTON PAISNER LLP

(57) ABSTRACT

Systems and methods including one or more processors and one or more non-transitory storage devices storing computing instructions configured to run on the one or more processors and cause the one or more processors to perform (1) receiving a request to generate one or more campaigns; (2) determining one or more predicted bids for one or more keywords in the one or more campaigns; (3) adjusting the one or more predicted bids for the one or more campaigns; (4) pacing the one or more predicted bid, as adjusted, for the one or more campaigns; and repeating (2)-(4) at one or more periodic intervals. Other embodiments are disclosed herein.

20 Claims, 5 Drawing Sheets

400

| 401 – Receiving a request to generate one or more campaigns |
|---|

| 402 – Determining one or more predicted bids for one or more keywords |
|---|

| 403 – Adjusting one or more predicted bids |
|---|

| 404 – Pacing one or more predicted bids |
|---|

| 405 – Coordinating displaying the one or more campaigns |
|---|

(56) References Cited

U.S. PATENT DOCUMENTS

| | | | | |
|---|---|---|---|---|
| 2008/0275757 | A1* | 11/2008 | Sharma | G06Q 30/02 705/7.29 |
| 2010/0145708 | A1* | 6/2010 | Master | G06Q 30/0273 704/E21.001 |
| 2011/0035276 | A1 | 2/2011 | Ghosh et al. | |
| 2011/0231264 | A1* | 9/2011 | Dilling | G06Q 30/0275 705/14.71 |
| 2013/0018824 | A1* | 1/2013 | Ghani | G06N 20/10 706/12 |
| 2013/0124308 | A1* | 5/2013 | Hegeman | G06Q 10/04 705/14.48 |
| 2014/0006170 | A1 | 1/2014 | Collette et al. | |
| 2014/0200995 | A1* | 7/2014 | Siegman | G06Q 30/0247 705/14.46 |
| 2014/0214590 | A1* | 7/2014 | Argue | G06Q 30/0631 705/26.7 |
| 2014/0337143 | A1* | 11/2014 | Petersen | G06Q 30/0275 705/14.71 |
| 2014/0337513 | A1* | 11/2014 | Amalapurapu | H04L 67/53 709/224 |
| 2015/0112795 | A1* | 4/2015 | Jalali | G06Q 30/0275 705/14.48 |
| 2015/0134462 | A1* | 5/2015 | Jalali | G06Q 30/0275 705/14.71 |
| 2015/0339728 | A1* | 11/2015 | Sura | G06Q 30/0277 705/14.73 |
| 2016/0162955 | A1* | 6/2016 | O'Kelley | G06Q 30/0277 705/14.71 |
| 2016/0180373 | A1* | 6/2016 | Xu | G06Q 30/0272 705/14.43 |
| 2016/0283974 | A1* | 9/2016 | Sodomka | G06Q 30/0247 |
| 2016/0292714 | A1* | 10/2016 | Bhalgat | G06Q 30/0242 |
| 2016/0294759 | A1* | 10/2016 | Huang | H04L 51/063 |
| 2017/0116645 | A1* | 4/2017 | Bishop | G06Q 30/0275 |
| 2017/0161855 | A1* | 6/2017 | Schreyer | G06Q 50/167 |
| 2018/0130156 | A1* | 5/2018 | Grau | G06Q 50/2057 |
| 2018/0314958 | A1* | 11/2018 | Sethi | G06N 5/02 |
| 2020/0045008 | A1* | 2/2020 | Banothu | H04L 67/535 |
| 2020/0066025 | A1* | 2/2020 | Peebler | G06V 20/20 |
| 2020/0094820 | A1* | 3/2020 | Dugas | G07C 5/085 |
| 2020/0162515 | A1* | 5/2020 | Dubinsky | G06F 21/45 |
| 2021/0096913 | A1* | 4/2021 | Nadeau | G06F 11/3476 |

OTHER PUBLICATIONS

Purplemath, Conjugates and Divising by Radicals, Internet Archive Capture date of Jul. 10, 2018 from URL https://www.purplemath.com/modules/radicals4.htm (Year: 2018).*

Google, About Target ROAS bidding—Google Ads Help, 2020 (Year: 2020).*

About Target ROAS Bidding—Google Ads Help, accessed at https://support.google.com/google-ads/answer/6268637?nl=en#:~:text=Your target ROAD is the, traffic your ads may get on Jan. 21, 2022 (4 pgs) 2020.

* cited by examiner

SYSTEMS AND METHODS FOR IMPROVED ONLINE PREDICTIONS

TECHNICAL FIELD

This disclosure relates generally to computer generated predictions and more specifically to computer generated predictions for search engine marketing.

BACKGROUND

Machine learning algorithms are becoming more commonplace in today's computer systems, but many data scientists and software engineers continue to encounter problems while training novel algorithms. One problem encountered when training machine learning algorithms is an inability to interpret volatile data. This is especially problematic for machine learned algorithms used for automatic purchases (e.g., automated trading algorithms, search engine marketing algorithms, etc.), as a severely overpredicted outcome can lead to recurring overpayments.

Therefore, there is a need for a system and method to quickly create predictions.

BRIEF DESCRIPTION OF THE DRAWINGS

To facilitate further description of the embodiments, the following drawings are provided in which.

Figure 1:
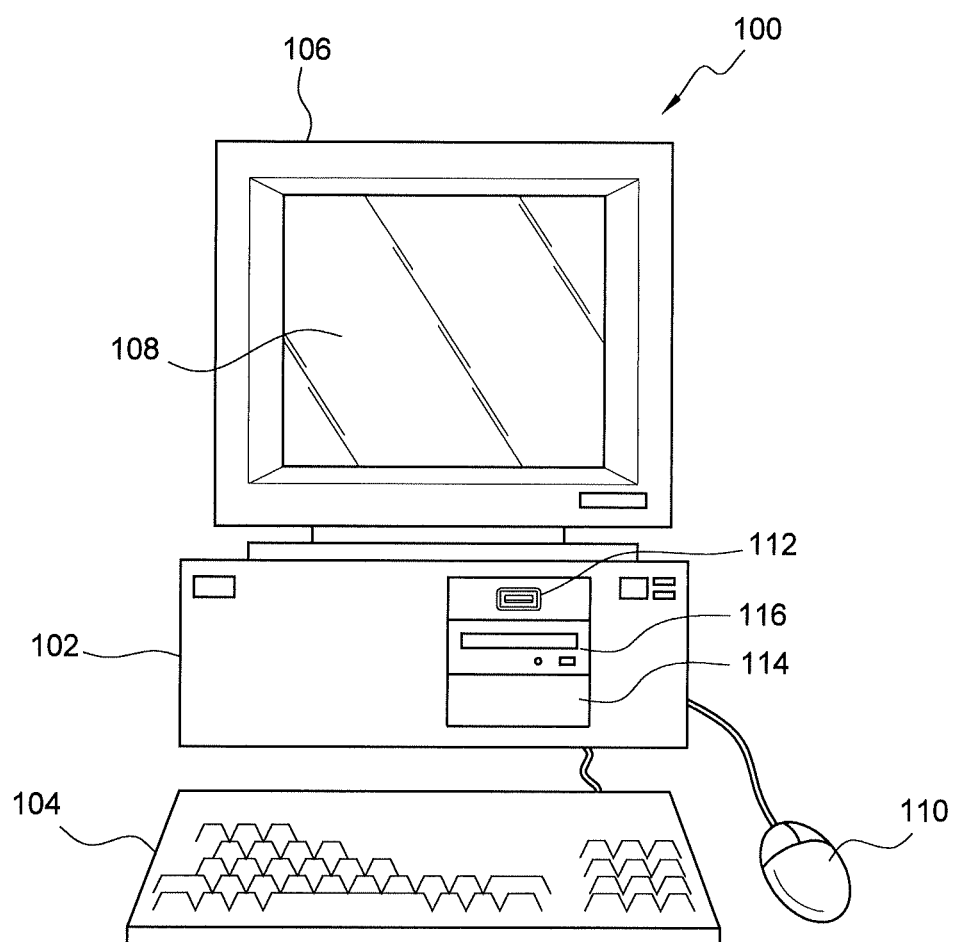
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and cause the one or more processors to perform (1) receiving a request to generate one or more campaigns; (2) determining one or more predicted bids for one or more keywords in the one or more campaigns; (3) adjusting the one or more predicted bids for the one or more campaigns; (4) pacing the one or more predicted bid, as adjusted, for the one or more campaigns; and repeating (2)-(4) at one or more periodic intervals.

Various embodiments include a method. The method can be implemented via execution of computing instructions configured to run at one or more processors and configured to be stored at non-transitory computer-readable media The method can comprise (1) receiving a request to generate one or more campaigns; (2) determining one or more predicted bids for one or more keywords in the one or more campaigns; (3) adjusting the one or more predicted bids for the one or more campaigns; (4) pacing the one or more predicted bid, as adjusted, for the one or more campaigns; and repeating (2)-(4) at one or more periodic intervals.

Figure 2:
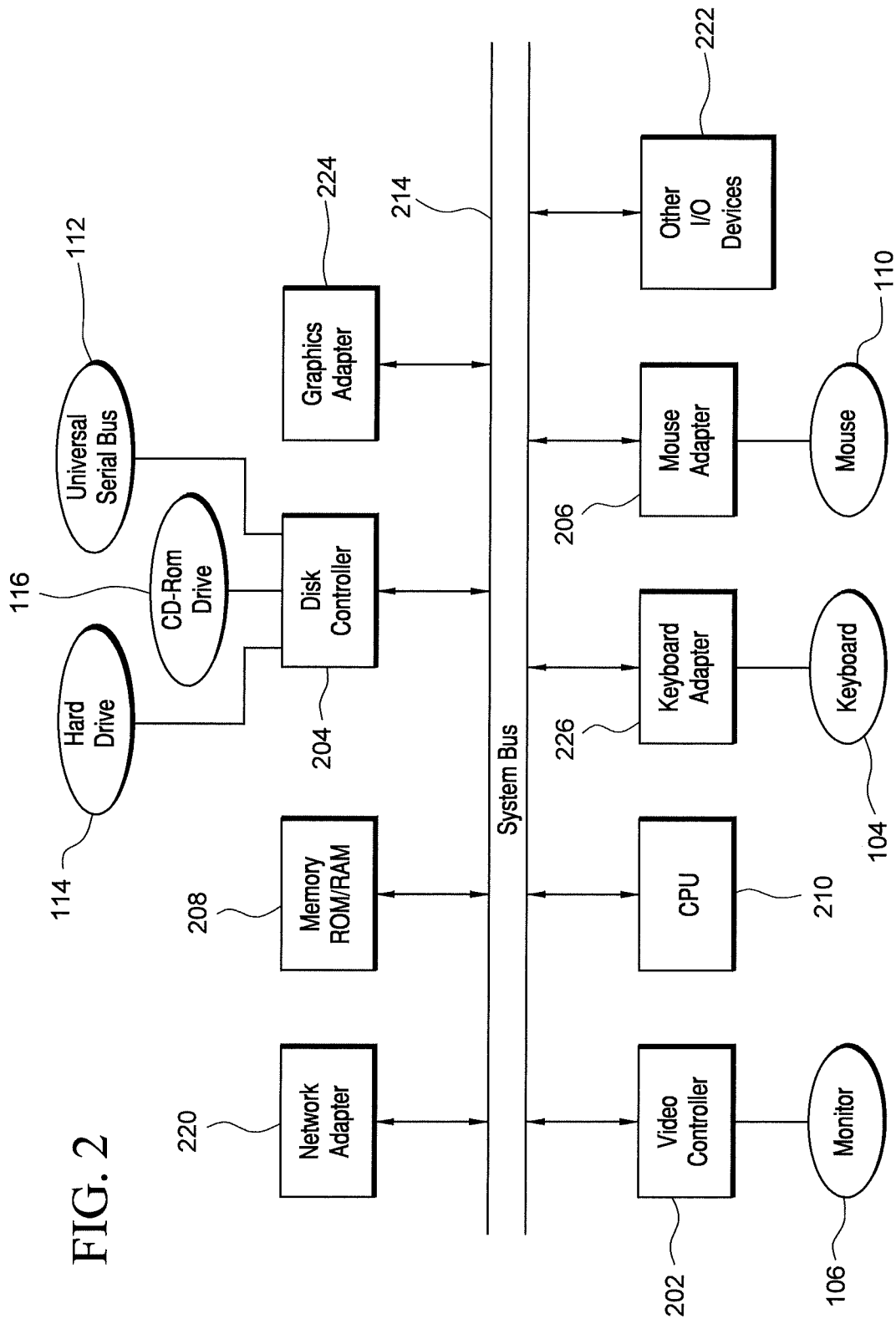
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
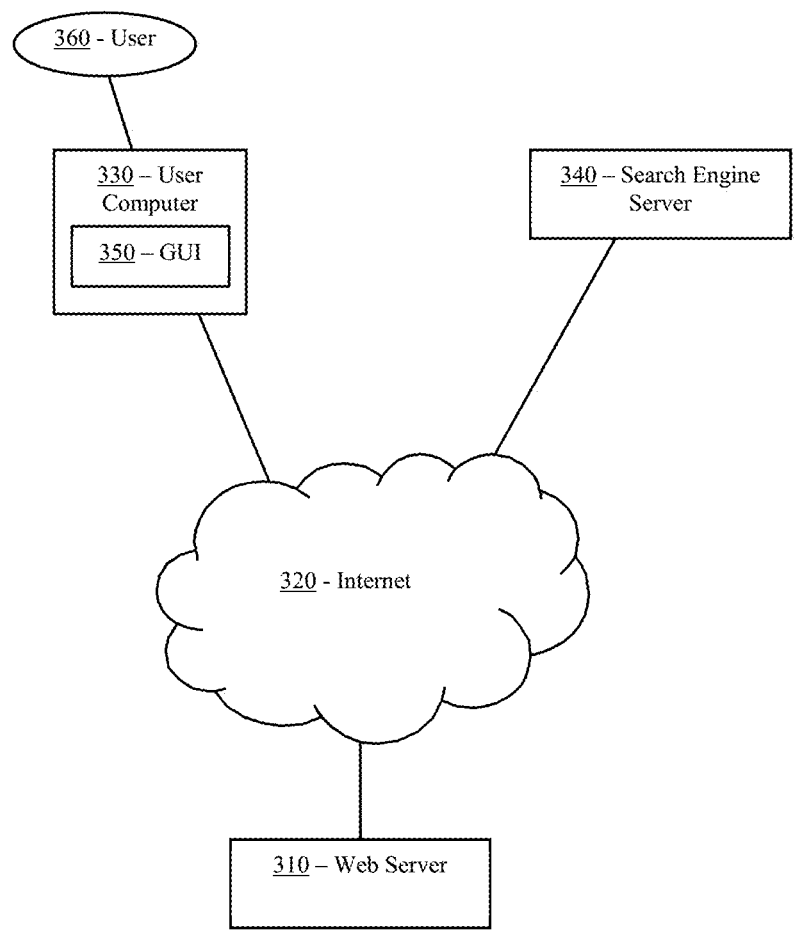
FIG. 3 illustrates a representative block diagram of a system, according to an embodiment.

Turning ahead in the drawings, FIG. 3 illustrates a block diagram of a system 300 that can be employed for improved online predictions, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 310, a user computer 330, and/or a search engine server 340. In many embodiments, user computer 330, and/or search engine server 340 can be external to system 300. Web server 310, user computer 330, and/or search engine server 340 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 310, user computer 330, and/or search engine server 340. Additional details regarding web server 310, user computer 330, and/or search engine server 340 are described herein.

User computer 330 can comprise any of the elements described in relation to computer system 100. In some embodiments, user computers 330, 331 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons. In various embodiments, user computers 330, 331 can comprise a display that is smaller than monitor 106 (FIG. 1), thereby facilitating mobility.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, Calif., United States of America.

In many embodiments, system 300 can comprise graphical user interface ("GUI") 350. In the same or different embodiments, GUI 350 can be part of and/or displayed by user computers 330, 331, which also can be part of system 300. In some embodiments, GUI 350 can comprise text and/or graphics (image) based user interfaces. In the same or different embodiments, GUI 350 can comprise a heads up display ("HUD"). When GUI 350 comprises a HUD, GUI 350 can be projected onto a medium (e.g., glass, plastic, etc.), displayed in midair as a hologram, or displayed on a display (e.g., monitor 106 (FIG. 1)). In various embodiments, GUI 350 can be color, black and white, and/or greyscale. In many embodiments, GUI 350 can comprise an application running on a computer system, such as computer system 100 (FIG. 1), web server 310, user computer 330, and/or search engine server 340. In the same or different embodiments, GUI 350 can comprise a website accessed through internet 320. In some embodiments, GUI 350 can comprise an eCommerce website. In these or other embodiments, GUI 350 can comprise an administrative (e.g., back end) GUI allowing an administrator to modify and/or change one or more settings in system 300. In the same or different embodiments, GUI 350 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

In some embodiments, web server 310, user computer 330, and/or search engine server 340 can be in data communication with each other through Internet 320. In certain embodiments, user computer 330 can be desktop computers, laptop computers, smart phones, tablet devices, and/or other endpoint devices. In various embodiments, web server 310 can host one or more websites. For example, web server 310 can host an eCommerce website that allows users to browse and/or search for products, to add products to an electronic shopping cart, and/or to purchase products, in addition to other suitable activities. In many embodiments, web server 310 can also be configured to generate one or more search engine marketing campaigns, as described in further detail below. For example, web server 310 can be configured to bid on search engine marking auctions managed by search engine server 340 and/or provide content to search engine server 340 for display in response to searches for keywords.

In some embodiments search engine server 340 can receive and process searches requested by user computer 330 and/or run a search engine marketing bidding system accessed by web server 310. Generally speaking, a search engine marketing bidding system can be configured to run and/or manage online systems that generate marketing campaigns displayed on search engine results pages. For example, many search engine providers have sponsored search results that appear near and/or the top of their search results pages. In many embodiments, content displayed as a sponsored result can be determined via an auction format for one or more keywords. When a search engine user searches for the keyword, the content that winds the auction can be shown as a sponsored result. For example, bids for a search keyword can be received at search engine server 340 from web server 310. When web server 310 is deemed to have a winning bid, search engine server 340 can display content provided by web server 310 (e.g., images, links, text, etc.) on user computer 330 at or near a top of a search results page for the key word.

In many embodiments, web server 310, user computer 330, and/or search engine server 340 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of web server 310, user computer 330, and/or search engine server 340 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 310, user computer 330, and/or search engine server 340. In a similar manner, the processing module(s) and the memory storage module(s) can be local and/or remote to each other.

Internet 320 can be an intranet that is not open to the public. In further embodiments, Internet 320 can be a mesh network of individual systems. Accordingly, in many embodiments, web server 310, (and/or the software used by such systems) can refer to a back end of system 300 operated by an operator and/or administrator of system 300, and user computer 330 (and/or the software used by such systems) can refer to a front end of system 300 used by one or more users 360, respectively. In some embodiments, user 360 can also be referred to as a customer, in which case, user computer 330 can be referred to as a customer computer. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 310, user computer 330, and/or search engine server 340 also can be configured to communicate with one or more databases. The one or more databases can comprise a product database that contains information about products, items, or SKUs (stock keeping units) sold by a retailer. In many embodiments, one or more databases can comprise information about interactions of user computer 330 with GUI 350. For example, the one or more databases can store past (e.g., historical) interactions of user computer 330 with GUI 350. These interactions can be tied to a unique identifier (e.g., an IP address, an advertising ID, device ID, etc.) and/or a user account. In embodiments where a user 360 interacts with GUIs 350 before logging into a user account, data stored in the one or more database that is associated with a unique identifier can be merged with and/or associated with data associated with the user account. In some embodiments, data can be deleted from a database when it becomes older than a maximum age. In many embodiments, a maximum age can be determined by an administrator of system 300. In various embodiments, data collected in real-time can be streamed to a database for storage.

In many embodiments, one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s). In various embodiments, databases can be stored in a cache (e.g., MegaCache) for immediate retrieval on-demand.

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, Postgr-eSQL Database, Microsoft SQL Server Database, Oracle Database, SAP (Systems, Applications, & Products) Database, IBM DB2 Database, and/or NoSQL Database.

Meanwhile, communication between web server 310, user computer 330, and/or search engine server 340, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can provide for faster generation of search engine marketing bids. These techniques described herein can provide a significant improvement over conventional approaches of predicting bids, such as using only a machine learning algorithm. Moreover, these estimates are technical improvements over other possible approaches, such as using only a machine learning algorithm because they can be determined faster and without extensive training. In many embodiments, the techniques described herein can beneficially make determinations based on dynamic information that describes current conditions and/or conditions that have occurred during the same day as bidding on a keyword. In this way, the techniques described herein can avoid problems with overpredicting by machine learning algorithms by continually cycling.

In a number of embodiments, the techniques described herein can solve a technical problem that arises only within the realm of computer networks, as search engine marketing does not exist outside the realm of computer networks.

Figure 4:
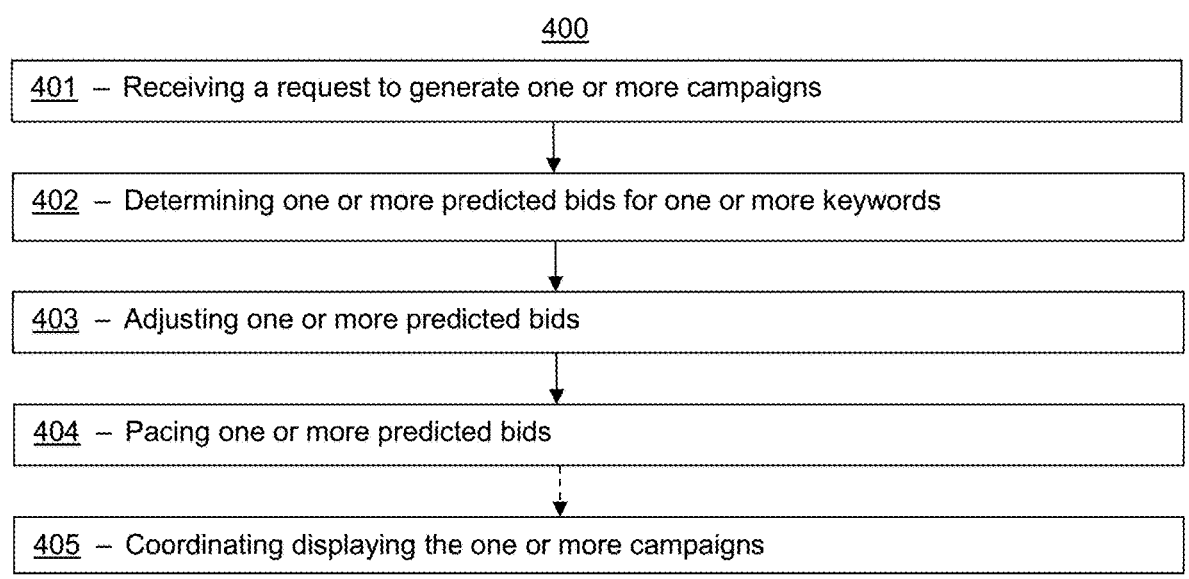
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as web server 310, user computer 330, and/or search engine server 340 (FIG. 3). The processing module(s) can be similar or identical to the processing module(s) described above with respect to computer system 100 (FIG. 1).

In many embodiments, method 400 can comprise an activity 401 of receiving a request to generate one or more campaigns. In various embodiments, one or more campaigns can comprise a search engine marketing campaign (e.g., as described above in FIG. 3). In some embodiments, requests to generate one or more campaigns can be received from entities outside of and/or within system 300 (FIG. 3). For example, one or more third party sellers using a marketplace hosted by web server 310 (FIG. 3) can submit a request for generation of a campaign. In these embodiments, the campaign can be for an item sold on the marketplace. A request to generate a campaign can include a number of parameters. For example, a request can comprise a budget for a campaign, a targeted return on advertisement spend (ROAS) for a campaign, duration for a campaign, an item to be marketed in a campaign, and/or a keyword to be targeted for a campaign. In many embodiments, a keyword for an item can be selected from a list and/or database of keywords provided by a search provider.

In many embodiments, method 400 can comprise an activity 402 of determining one or more predicted bids for one or more keywords. A predicted bid can be determined using a number of different criteria. For example, one or more predicted bids can be received as a part of activity 401 as an initial bid and/or a desired revenue per click (RPC) for one or more campaigns. In some embodiments, an RPC can comprise a revenue generated for every click of a search engine advertisement. In various embodiments, an initial bid can be determined using a predictive algorithm. For example, a predicted bid can be determined using a machine learning algorithm. In many embodiments, a predictive algorithm can be configured to determine an initial bid by predicting a RPC for the campaign. In many embodiments, a predictive algorithm can be trained on historical data for one or more items, campaigns, and/or keywords.

In some embodiments, training a predictive algorithm can comprise estimating internal parameters of a model configured to determine predicted bids and/or RPCs. In various embodiments, a predictive algorithm can be trained using labeled and/or unlabeled training data, otherwise known as a training dataset. In many embodiments, a training dataset can comprise historical data for one or more items, campaigns, and/or keywords (e.g., RPC, CPC, total revenue, budget, total spend, etc.). In this way, a predictive algorithm can be configured to estimate a bid and/or a RPC. In the same or different embodiments, a pre-trained machine learning algorithm can be used, and the pre-trained algorithm can be re-trained on the labeled training data. In some embodiments, the predictive algorithm can also consider both historical and dynamic input from an advertisement campaign. In this way, a machine learning algorithm can be trained iteratively as data from the advertising campaign is added to a training data set. In many embodiments, a predictive algorithm can be iteratively trained in real time as data is added to a training data set. In various embodiments, a predictive algorithm can be trained, at least in part, on an item's historical data or the item's historical data can be weighted in a training data set. In this way, a predictive algorithm tailored to a single user can be generated. In the same or different embodiments, a predictive algorithm tailored to an item's user can be used as a pre-trained algorithm for a similar item.

In many embodiments, a predictive algorithm cannot be used to generate a predicted bid and/or RPC for items and/or keywords. For example, some items/keywords do not have sufficient training data and a predictive algorithm would therefore be inaccurate. In these embodiments, when an amount of training data is below a predetermined threshold, predictions for similar items and/or keywords can be used instead. In further embodiments, a predetermined threshold can be set by an administrator and/or be dependent on interaction data for an item. For example, a predetermined threshold can be set as a number of days without traffic (e.g., 2 weeks without traffic). In many embodiments, a similar item can be selected based on a classification of an item and/or a keyword. In various embodiments, a predicted bid can be determined using a ROAS (e.g., a ROAS submitted in activity 401, above) and/or a predicted RPC. In many embodiments, a ROAS and/or an RPC can be determined at a campaign level and/or an item level. In further embodiments, a predicted bid can be determined using the equation below:

$$\text{predicted bid} = \frac{RPC}{ROAS}.$$

In many embodiments, an advertising campaign can be warmed up before proceeding to other activities of method 400. In this way, additional data points regarding an advertising campaign can be gathered, thereby leading to more successful predictions for method 400. In some embodiments, an advertisement campaign can be warmed up by modulating a ROAS used to determine a predicted bid. In various embodiments, a ROAS can be lowered by a predetermined percentage in order for a predetermined period of time. Generally speaking, a warm up period can be used to ensure that a campaign has enough traffic to establish a performance baseline.

In many embodiments, method 400 can comprise an activity 403 of adjusting one or more predicted bids. In some embodiments, activity 403 can be performed after one or more campaigns are warmed up, as described in activity 402 above. In further embodiments, activity 403 can be performed only for top ranked items, keywords, and/or campaigns (e.g., top ranked in sellers, clicks, views, etc.). In some embodiments, activity 403 can be performed more often for higher ranked items, keywords, and/or campaigns than for lower ranked items, keywords, and/or campaigns. In various embodiments, activity 403 can be performed at one or more intervals and/or for one or more cycles for a campaign's duration. For example, bids can be adjusted every week, every two weeks, etc. In many embodiments, one or more bids can be adjusted so that a ROAS for a campaign is spread across one or more advertisements for the campaign. In some embodiments, a ROAS can be spread across only warmed up advertisements, as described in activity 402. A predicted bid can be adjusted in a number of ways. In various embodiments, a predicted bid for an advertisement and/or for a campaign can be adjusted using the equation below:

$$\text{bid} = \text{bid}_{last} * \sqrt{\frac{ROAS_{item}}{ROAS_{target}}}$$

In some embodiments, $ROAS_{item}$ is a ROAS for an item and/or keyword in one or more campaigns, $ROAS_{target}$ is a ROAS received with a request to generate the one or more campaigns.

In some embodiments, one or more of a minimum and/or a maximum can be set for an item and/or campaign. In this way, a campaign can be reset if it overpredicts in in either direction. For example, if a ROAS for an item is larger than a target ROAS for a campaign, a bid for that item can be capped at a specific value to prevent bidding too high. As another example, if a ROAS for an item is smaller than a target ROAS for a campaign, a floor for a bid for that item can be set at a specific value to prevent bidding too low. In various embodiments, a cap and/or floor can be calculated using the equation below:

$$\text{bid}_{RPC} = \frac{RPC}{ROAS_{target}}$$

In various embodiments, $\text{bid}_{RPC}$ is the cap or floor; RPC is a current RPC for an item campaign, and/or keyword; and $ROAS_{target}$ is a ROAS received with a request to generate the one or more campaigns. In many embodiments, two different adjustments for an item, keyword, and/or campaign can be compared in an AB test.

In many embodiments, method 400 can comprise an activity 404 of pacing one or more predicted bids. Generally speaking, activity 404 can be configured to bring a ROAS for an item, keyword, and/or campaign closer to a target value (e.g., a value received in activity 401). In some embodiments, activity 404 can be performed after one or more campaigns are warmed up, as described in activity 402 above. In various embodiments, activity 404 can be performed at one or more intervals and/or for one or more cycles for a campaign's duration. For example, bids can be paced every week, every two weeks, etc. In various embodiments, pacing one or more bids can comprise multiplying the one or more bids by a pacing factor. In some embodiments, a pacing factor can be increased and/or decreased after a cycle and/or a predetermined period of time. In these or other embodiments, a value of a pacing factor can change depending one or more metrics for an item, keyword, and/or campaign. For example, if a ROAS for an item is above a target ROAS, then a pacing factor can be set to greater than one. As another example, if an advertisement spend for a campaign is less than a total budget for the campaign, a pacing factor can be set to greater than one. A pacing factor for the above two example can be set to less than one if the opposite is true. In some embodiments, an amount of a pacing factor applied to a bid can be changed after one or more cycles and/or after a predetermined period of time. For example, a pacing factor can be increased by 10% of its total value every day.

In some embodiments, method 400 can optionally comprise activity 405 of coordinating displaying the one or more campaigns. In many embodiments, one or more campaigns can be displayed on one or more GUIs displayed on one or more user devices (e.g., GUI 350 (FIG. 3) displayed on user computer 330 (FIG. 3). In various embodiments, displaying a campaign can comprise displaying one or more search engine marketing advertisements for one or more items. In these embodiments, a link embedded in an advertisement can forward a user to an eCommerce website where the one or more items can be purchased. In various embodiments, information regarding an item can be transferred to a search engine server (e.g., search engine server 340 (FIG. 3)) for display in a search engine marketing campaign. In some embodiments, activity 405 can be performed in response to winning and/or initiating one or more search engine marketing auctions. For example, many search engine marketing systems request information regarding an item (e.g., a link to the item, a description of the item, a price for the item) before bidding one or more keywords.

Figure 5:
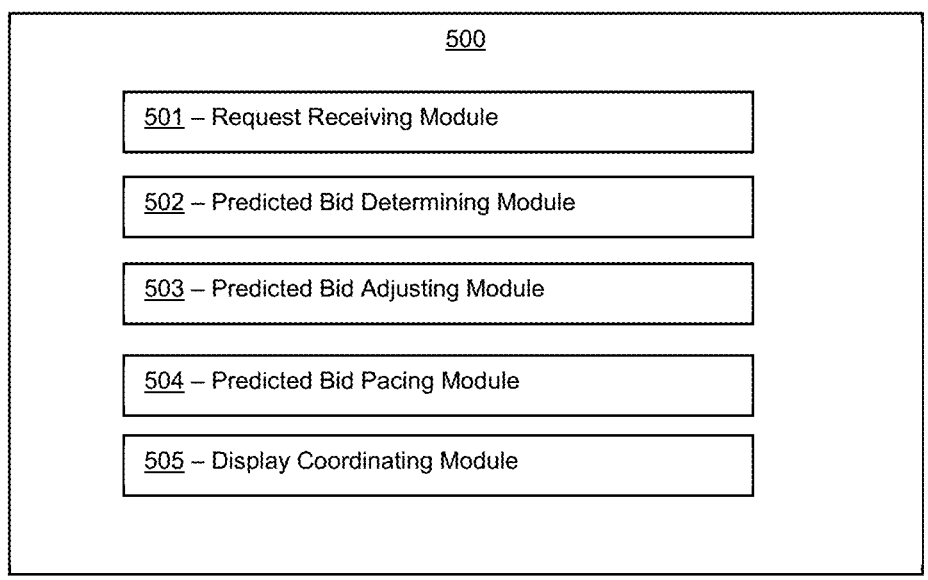
FIG. 5 illustrates a representative block diagram of a system, according to an additional embodiment.

Turning ahead in the drawings, FIG. 5 illustrates a block diagram of a system 500 that can be employed for improved online predictions. System 500 is merely exemplary and embodiments of the system are not limited to the embodiments presented herein. System 500 can be employed in many different embodiments or examples not specifically depicted or described herein. In some embodiments, certain elements or modules of system 500 can perform various procedures, processes, and/or activities. In these or other embodiments, the procedures, processes, and/or activities can be performed by other suitable elements or modules of system 500. In some embodiments, one or more portions of system 500 can be part of or in communication with web server 310 (FIG. 3), search engine server 340, and/or user computer 330. (FIG. 3).

Generally, therefore, system 500 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 500 described herein.

In many embodiments, system 500 can comprise non-transitory memory storage module 501. Memory storage module 501 can be referred to as request receiving module 501. In many embodiments, request receiving module 501 can store computing instructions configured to run on one or more processing modules and perform one or more acts of method 400 (FIG. 4) (e.g., activity 401 (FIG. 4)).

In many embodiments, system 500 can comprise non-transitory memory storage module 502. Memory storage module 502 can be referred to as predicted bid determining module 502. In many embodiments, predicted bid determining module 502 can store computing instructions configured to run on one or more processing modules and perform one or more acts of method 400 (FIG. 4) (e.g., activity 402 (FIG. 4)).

In many embodiments, system 500 can comprise non-transitory memory storage module 503. Memory storage module 503 can be referred to as predicted bid adjusting module 503. In many embodiments, predicted bid adjusting module 503 can store computing instructions configured to run on one or more processing modules and perform one or more acts of method 400 (FIG. 4) (e.g., activity 403 (FIG. 4)).

In many embodiments, system 500 can comprise non-transitory memory storage module 504. Memory storage module 504 can be referred to as predicted bid pacing module 504. In many embodiments, predicted bid pacing module 504 can store computing instructions configured to run on one or more processing modules and perform one or more acts of method 400 (FIG. 4) (e.g., activity 404 (FIG. 4)).

In many embodiments, system 500 can comprise non-transitory memory storage module 505. Memory storage module 505 can be referred to as display coordinating module 505. In many embodiments, display coordinating module 505 can store computing instructions configured to run on one or more processing modules and perform one or more acts of method 400 (FIG. 4) (e.g., activity 405 (FIG. 4)).

Although systems and methods for improved online predictions have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions that, when executed on the one or more processors cause the one or more processors to perform operations comprising:
   (1) receiving a request to generate one or more campaigns;
   (2) determining, by a predictive algorithm via a machine learning model, one or more predicted bids for one or more keywords in the one or more campaigns, wherein the predictive algorithm uses historical data of historical campaigns as a training data set and outputs the one or more predicted bids for the one or more keywords in the one or more campaigns;
   (3) adjusting the one or more predicted bids for the one or more keywords in the one or more campaigns by multiplying the one or more predicted bids by a square root of a quotient of a return on advertisement spend (ROAS) for an item divided by a ROAS received with the request to generate the one or more campaigns;
   (4) pacing the one or more predicted bids, as adjusted, for the one or more keywords in the one or more campaigns, wherein pacing the one or more predicted bids, as adjusted, comprises multiplying the one or more predicted bids, as adjusted, by a pacing factor; and
   iterating (2)-(4) at one or more periodic intervals as real-time data from the one or more campaigns is added to the training data set, wherein the iterating comprises repeated cycling of (2)-(4) to prevent over-predictions of predictive bids, and wherein the real-time data of performance of the one or more campaigns is iteratively added to the training data set for the predictive algorithm, as trained.

2. The system of claim 1, wherein adjusting the one or more predicted bids comprises adjusting the one or more predicted bids for the one or more keywords of one or more top ranked campaigns more often than of one or more lower ranked campaigns, and wherein the one or more campaigns comprise the one or more top ranked campaigns and the one or more lower ranked campaigns.

3. The system of claim 1, wherein the request to generate the one or more campaigns comprises one or more of:
   a budget for the one or more campaigns;
   a targeted ROAS for the one or more campaigns;
   a campaign duration for the one or more campaigns; and
   one or more items in the one or more campaigns.

4. The system of claim 3, wherein determining, by the predictive algorithm via the machine learning model, the one or more predicted bids comprises:
   for items of the one or more items with sufficient training data, using a trained predictive algorithm to determine the one or more predicted bids; and
   for items of the one or more items without sufficient training data, using a baseline bid for a classification of the one or more items as the one or more predicted bids.

5. The system of claim 1, wherein multiplying the one or more predicted bids, as adjusted, by the pacing factor comprises:
   changing a value of the pacing factor based on one or more metrics for the item, a keyword, or a campaign.

6. The system of claim 1, wherein the pacing factor is increased by at least 10% after a predetermined time interval.

7. The system of claim 1, wherein the pacing factor is above 1 when the one or more campaigns are under budget.

8. The system of claim 1, wherein adjusting the one or more predicted bids for the one or more keywords in the one or more campaigns comprises:

A/B testing two different values for the one or more predicted bids.

9. The system of claim 1, wherein adjusting the one or more predicted bids comprises placing a bid ceiling on the one or more predicted bids.

10. A method being implemented via execution of computing instructions configured to run on one or more processors and stored at non-transitory computer-readable media, the method comprising:
(1) receiving a request to generate one or more campaigns;
(2) determining, by a predictive algorithm via a machine learning model, one or more predicted bids for one or more keywords in the one or more campaigns, wherein the predictive algorithm uses historical data of historical campaigns as a training data set and outputs the one or more predicted bids for the one or more keywords in the one or more campaigns;
(3) adjusting the one or more predicted bids for the one or more keywords in the one or more campaigns, by multiplying the one or more predicted bids by a square root of a quotient of a return on advertisement spend (ROAS) for an item divided by a ROAS received with the request to generate the one or more campaigns;
(4) pacing the one or more predicted bids, as adjusted, for the one or more keywords in the one or more campaigns, wherein pacing the one or more predicted bids, as adjusted, comprises multiplying the one or more predicted bids, as adjusted, by a pacing factor; and
iterating (2)-(4) at one or more periodic intervals as real-time data from the one or more campaigns is added to the training data set, wherein the iterating comprises repeated cycling of (2)-(4) to prevent over-predictions of predictive bids, and wherein the real-time data of performance of the one or more campaigns is iteratively added to the training data set for the predictive algorithm, as trained.

11. The method of claim 10, wherein adjusting the one or more predicted bids comprises adjusting the one or more predicted bids for the one or more keywords of one or more top ranked campaigns more often than of one or more lower ranked campaigns, and wherein the one or more campaigns comprise the one or more top ranked campaigns and the one or more lower ranked campaigns.

12. The method of claim 10, wherein the request to generate the one or more campaigns comprises one or more of:
a budget for the one or more campaigns;
a targeted ROAS for the one or more campaigns;
a campaign duration for the one or more campaigns; and
one or more items in the one or more campaigns.

13. The method of claim 12, wherein determining, by the predictive algorithm via the machine learning model, the one or more predicted bids comprises:
for items of the one or more items with sufficient training data, using a trained predictive algorithm to determine the one or more predicted bids; and
for items of the one or more items without sufficient training data, using a baseline bid for a classification of the one or more items as the one or more predicted bids.

14. The method of claim 10, wherein multiplying the one or more predicted bids, as adjusted, by the pacing factor comprises:
changing a value of the pacing factor based on one or more metrics for the item, a keyword, or a campaign.

15. The method of claim 10, wherein the pacing factor is increased by at least 10% after a predetermined time interval.

16. The method of claim 10, wherein the pacing factor is above 1 when the one or more campaigns are under budget.

17. The method of claim 10, wherein adjusting the one or more predicted bids for the one or more keywords in the one or more campaigns comprises:
A/B testing two different values for the one or more predicted bids.

18. The method of claim 10, wherein adjusting the one or more predicted bids comprises placing a bid ceiling on the one or more predicted bids.

19. The system of claim 1, wherein at least one of:
dynamic data from the one or more campaigns is used as input for the predictive algorithm;
the computing instructions, when executed on the one or more processors, further cause the one or more processors to perform operations comprising:
iteratively training in real-time the predictive algorithm using the training data set as the real-time data; and
iteratively adding in real-time the dynamic data from the one or more campaigns to the training data set; or
the computing instructions, when executed on the one or more processors, further cause the one or more processors to perform operations comprising:
generating the training data set by using at least one of labeled training data or unlabeled training data;
when an amount of the training data is below a predetermined threshold, substituting data for the one or more predicted bids with predicted data for similar items; and
training the predictive algorithm using the training data set for estimating internal parameters of the machine learning model.

20. The method of claim 10, further comprising at least one of:
(a) using dynamic data from the one or more campaigns as input for the predictive algorithm;
(b) iteratively training in real-time the predictive algorithm using the training data set as the real-time data; and
iteratively adding in real-time the dynamic data from the one or more campaigns to the training data set; or
(c) generating the training data set by using at least one of labeled training data or unlabeled training data;
when an amount of the training data is below a predetermined threshold, substituting data for the one or more predicted bids with predicted data for similar items; and
training the predictive algorithm using the training data set for estimating internal parameters of the machine learning model.

* * * * *